United States Patent Office 3,769,342
Patented Oct. 30, 1973

3,769,342
DIALKOXY PHENYLENE BIS-SULFONAMIDES
Zaven S. Ariyan, Woodbury, Conn., and Robert L. Martin, Endicott, N.Y., assignors to Uniroyal, Inc., New York, N.Y.
No Drawing. Original application Mar. 6, 1971, Ser. No. 804,998, now Patent No. 3,621,032. Divided and this application Mar. 8, 1971, Ser. No. 122,157
Int. Cl. C07c *143/80*
U.S. Cl. 260—556 S      4 Claims

ABSTRACT OF THE DISCLOSURE

Dialkoxy phenylene bis-sulfonamides having utility as foliage fungicides.

---

This application is a divisional of Ser. No. 804,998, filed Mar. 6, 1969, now Pat. No. 3,621.032.

Polysulfur tricyclic compounds, wherein two substituted aromatic rings are attached to each other through two tetrasulfide links, can be split.

PRIOR ART

Although applicants are not aware of any prior art that is relevant to the invention, a brief discussion of the background in chemistry underlying the present invention may facilitate its appreciation.

It has previously been reported [Z. S. Ariyan and L. A. Wiles, J. Chem. Soc. 4709–12 (1962)] that the dimethoxybenzenes vary greatly in their reactivity towards sulfur monochloride (Cl—S—S—Cl). The order of reactivity with ($S_2Cl_2$) is para-dimethoxybenzene < ortho-dimethoxybenzene < meta-dimethoxybenzene. The meta-disubstituted derivative is the most reactive while the least reactive is the para-derivative. No catalysts were used in the reported reactions and the products were linear sulfides. Their reactions could be represented by the following equations:

$$(MeO)_2\text{—R—H} + \text{Cl—S—S—Cl} \xrightarrow{\text{solvent}} (MeO)_2\text{—R—S—S—R—}(OMe)$$

There is no reported example in the chemical literature of two aromatic rings attached to each other by two sets of chains of sulfur atoms such as the replacement of the methylenes in [2.2] paracyclophane (II) by sulfur atoms. About sixty years ago, [W. Autenrieth Ber. 41, 4249 (1908; 42, 4346 (1909)] described a sixteen membered and an eighteen membered ring system (III and IV) derived respectively from meta-xylylene dithiol and para-xylylene dithiol.

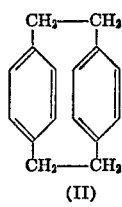
(II)

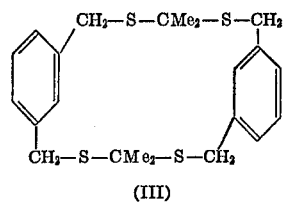
(III)

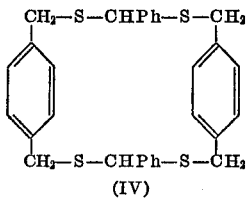
(IV)

SUMMARY OF INVENTION

The invention relates to novel tricyclic systems in which two aromatic rings are attached to each other by two tetrasulfide links. The novel tricyclic systems may be represented by the Formula (I)

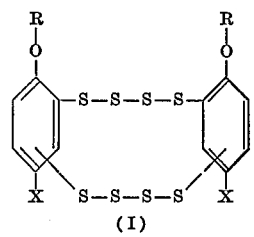
(I)

wherein X is alkoxy (OR), alkylthio (SR) or halogen, R being represented by straight or branched alkyl, hereinafter referred to as "cyclic-bis-tetrasulfides" or "CBT."

The invention is also concerned with a novel process for preparing the novel cyclic-bis-tetrasulfides.

Considered from another aspect, the invention relates to novel compounds obtained by the splitting of CBT.

As will be noted from Formula I of the novel cyclic-bis-tetrasulfides, the positions of substitution by the sulfur atoms onto the aromatic rings may vary and are in fact determined by the respective substituents on the ring.

The aromatic rings themselves are disubstituted with at least one alkoxy group, a thioalykyl group or a halogen. The ring substituents are preferably situated in para-positions respective to the ring. In Formula I, X represents either an alkoxy group O—R; an alkylthio group S—R or a halogen. Chlorine is a suitable halogen for the inventive purposes. Ray may be any alkyl group, either straight or branched. Preferred alkyls are the lower alkyls of from 1–5 carbon atoms.

The size of the central sulfur ring is determined by the position of substitution of the sulfur atoms which may occur at 2:3-; 2:5-; or 2:6- depending on the nature of the ring substituents and particularly of X.

The cyclic-bis-tetrasulfides are high melting, yellow to deep orange crystalline products which may be readily prepared by the reaction of a para-substituted alkoxybenzene with sulfur monochloride (Cl—S—S—Cl) in the presence of a catalyst. The reaction is advantageously carried out at elevated temperatures within the temperature range of about 40–70° C. A convenient catalyst for the reaction is a Lewis acid type catalyst, such as anhydrous aluminum chloride, boron trifluoride, tin or antimony chlorides and, preferably, a "montmorillonite catalyst of the K-series" which is readily available from Chemical Products Division of Chemetron Corporation and designated hereafter "Girdler Catalyst KSF/O." It has been found that the presence of a catalyst is of utmost importance for the preparation of the cyclic-bis-tetrasulfides. A diluent should also be present. Suitable diluents are carbon disulfide, chloroform, carbon tetrachloride, methylene dichloride, ethylene dichloride or, in general, halogenated aliphatic hydrocarbon solvents. Reaction at the boiling temperature of the solvent or diluent is preferred. Most of the indicated solvents boil within the indicated preferred 40–70° C. range.

In the preparation of the cyclic-bis-tetrasulfides, the para-substituted alkoxybenzene is vigorously stirred in the solvent with 5% by weight of the catalyst, to which is added sulfur monochloride (ClSSCl) in the same solvent. After complete addition of the sulfur reagent and if no reaction is apparent, heat, for example, in the form of steam is applied. Invariably hydrogen chloride gas begins evolving after all the sulfur monochloride has been added and the reaction mixture assumes a deep green color, due to the formation of a complex intermediate. The reaction mixture is thus stirred and heated until all the hydrogen chloride gas has evolved. The deep green color has also disappeared at that time. The reaction time may vary from two to five hours. The reaction mixture is then filtered while hot to cause separation from the catalyst and an orange solution results. Some of the solvent may have to be evaporated off to allow crystallization of the product. As will be seen from the examples given hereinbelow, in some cases work-up methods are required whereas in others the products are relatively insoluble and precipitate from the solution. For example, on standing of a reaction product solution obtained foam p-diethoxybenzene, large orange crystals appear, while an extremely insoluble orange product is obtained from p-dimethoxybenzene. Both these products are cyclic-bis-tetrasulfides. In the case of insoluble products soxhlet extraction method may have to be used to remove the product from the catalyst, since filtration of the hot reaction product solution does not yield the desired separation. In respect to other derivative, column chromatography on alumina is invariably of value, since any elemental sulfur is then removed on the alumina.

The orange crystals consist of the novel CBT compounds. Their structure has been supported by a variety of physical methods. Such methods as X-ray, Nuclear Magnetic Resonance (N.M.R.), Ultraviolet (U.V.), Infrared (I.R.), molecular weight and elemental analysis have been used to elucidate and conclude on the crystalline nature of these compounds.

A general scheme for the reaction steps may be represented by the following:

Although applicants do not want to be limited by any theories advanced by them, it is believed that the first step in the reaction is a bis-chlorodithio-derivative formation (Cl—S—S—Z—S—S—Cl) where Z represents a divalent radical such as a para-substituted alkoxybenzene. Such intermediates from sulfur monochloride reactions are known and have been reported in J. Chem. Soc. 1725 (1962).

(Step (1))

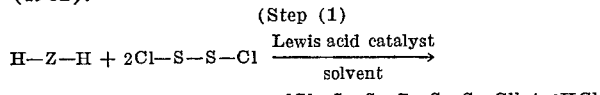

$$\text{H—Z—H} + 2\text{Cl—S—S—Cl} \xrightarrow[\text{solvent}]{\text{Lewis acid catalyst}} [\text{Cl—S—S—Z—S—S—Cl}] + 2\text{HCl}$$

Step two involves the formation of an intermediate with loss of chlorine. Evidence for such reactions is available in the literature.

Table I lists a number of cyclic-bis-tetrasulfides which have been prepared and the elemental analytical results obtained.

Step (2)

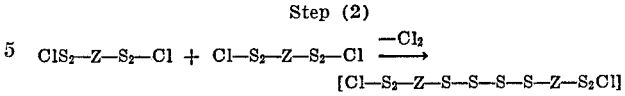

$$\text{ClS}_2\text{—Z—S}_2\text{—Cl} + \text{Cl—S}_2\text{—Z—S}_2\text{—Cl} \xrightarrow{-\text{Cl}_2} [\text{Cl—S}_2\text{—Z—S—S—S—S—Z—S}_2\text{Cl}]$$

Step three is a step similar to step two, whereby another mole of chlorine is lost intramolecularly (within the same molecule) by a mechanism which favors such as cyclization to yield the inventive cyclic-bis-tetrasulfide of Formula I.

Step (3)

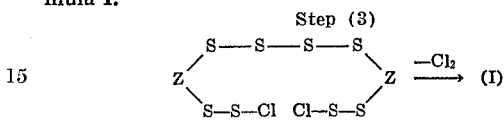

Polymer formation in sulfur monochloride reactions is well known and it has been found that after separation of the crystalline cyclic-bis-tetrasulfide (I) an orange oil is also obtained.

TABLE I.—R AND X IN FORMULA (I)

| R | X | M.P. | General formula | Calculated | | | | Found | | | |
|---|---|---|---|---|---|---|---|---|---|---|---|
| | | | | C | H | S | Cl | C | H | S | Cl |
| CH₃ | OCH₃ | 210–215 | C₁₆H₁₆O₄S₈ | 36.34 | 3.05 | 48.51 | | 36.67 | 3.22 | 48.36 | |
| C₂H₅ | OC₂H₅ | 185 | C₂₀H₂₄O₄S₈ | 41.07 | 4.13 | 43.86 | | 41.34 | 4.07 | 44.24 | |
| CH₃ | OC₂H₅ | 158–60 | C₁₈H₂₀O₄S₈ | 38.82 | 3.62 | 46.07 | | 38.86 | 3.66 | 46.11 | |
| CH₃ | Cl | 195–8 | C₁₄H₁₆O₂Cl₂S₈ | 31.27 | 1.88 | 47.68 | 13.18 | 31.52 | 1.91 | 47.53 | 13.06 |
| PhCH₂ | OCH₂·Ph | 172–5 | C₄₀H₃₂O₄S₈ | 57.66 | 3.87 | 30.79 | | 57.90 | 3.98 | 30.63 | |

The inventive cyclic-bis-tetrasulfides exhibit significant accelerator activity in rubber vulcanizing processes. This activity is particularly pronounced in the vulcanization of styrene butadiene rubber (SBR) and ethylene propylene diene rubber (EPDM as indicated by Monsanto Rheometer tests. Comparison tests carried out with cyclic Bi(2,5-bis-dithio-1,4-diethoxybenzene) and the prior art commercial accelerator tetramethylthiuram disulfide, which is also known under the trademark Tuex®, indicated that the former compound is superior to Tuex in the vulcanizing of SBR.

The inventive CBT compounds may be degraded or split into useful new compounds. Depending on the splitting process to which the CBT compounds are subjected, the following three groups of compounds may thus be obtained:

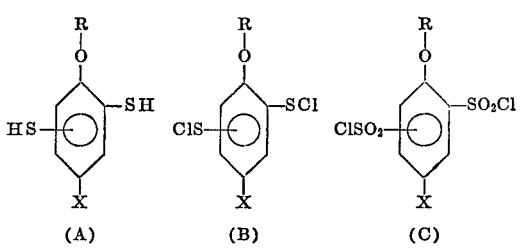

(A)  (B)  (C)

wherein X and R have the above meaning.

Compounds of group A are para-substituted alkoxybenzenes with two mercapto groups and thus constitute aromatic dithiols which are obtained by the hydrogenation of CBT under controlled conditions. By contrast, chlorination under anhydrous conditions in a non-polar solvent, such as carbon tetrachloride, degrades CBT to reactive compounds of group B, such as disulfenyl chlorides. Compounds of group B are difficult to isolate and are thus used in situ. Chlorination of CBT in the presence of trace mounts of water in turn yields disulfonyl chlorides of group C.

Compounds A, B and C are bifunctional. They constitute new compositions of matter, have utility per se, and may be successfully used in a variety of syntheses for the presentation of other useful compounds.

The primary utility of the compounds A, B and C is herbicidal and fungicidal.

Reduction products of CBT compounds

The controlled hydrogenation of CBT results in reduction to aromatic dithiols of group A. Such a process may advantageously be carried out with a platinum sulfide catalyst supported on carbon. The hydrogenation is performed in a solvent, such as benzene or toluene, for an average period of four (4) hours at a temperature of about 200° C. and at a pressure range of 900–1300 p.s.i.g. See Table II.

TABLE II

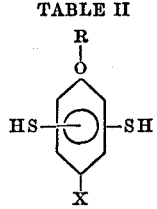

| | | | | | (A) Calculated | | | | Found | | | |
|---|---|---|---|---|---|---|---|---|---|---|---|---|
| R | X | M. | Position | General formula | C | H | S | Cl | C | H | S | Cl |
| C₂H₅ | OC₂H₅ | 117 | 2:5- | C₁₀H₁₄O₂S₂ | 52.17 | 6.09 | 27.83 | | 52.19 | 6.29 | 27.54 | |
| CH₃ | Cl | 43.5–44 | 2:6- | C₇H₇OS₂Cl | 40.66 | 3.41 | 31.02 | 17.15 | 40.95 | 3.82 | 31.95 | 18.09 |
| CH₃ | OC₂H₄ | 69 | 2:5- | C₉H₁₂O₂S₂ | 49.97 | 5.58 | 29.65 | | 50–74 | 5.49 | 29.08 | |
| C₄H₉ | OC₄H₉ | 77–78 | 2:5 | C₁₄H₂₂O₂S₂ | 58.70 | 7.74 | 22.39 | | 57.84 | 7.71 | 22.44 | |
| CH₃ | OCH₃ | 122 | 2:5 | C₈H₁₀O₂S₂ | 47.49 | 4.98 | 31.71 | | 47.93 | 5.18 | 31.50 | |

The scheme for obtaining the compounds A, B and C may be demonstrated by the following:

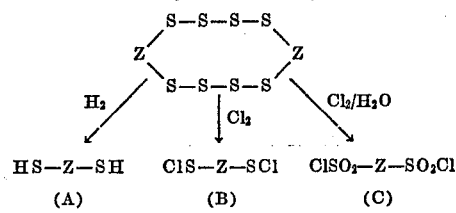

wherein Z represents the para-substituted alkoxybenzene rings of Formula I.

In order to appreciate this aspect of the invention, it should be considered that there is no direct convenient way of preparing dimercapto-(p-substituted alkoxybenzenes) or (alkoxy, alkylthio)-benzenes. This invention, for the first time, proposes such derivatives Z—(SH)₂ designated (A), their chlorination products Z—(SCl)₂ designated (B), which are normally used in situ, and their oxidation products Z—(SO₂Cl)₂ designated (C).

It is well known that in sulfur monochloride reactions, polymers often occur due to lengthening of the chains by sulfur atoms. In the formation of the inventive cyclic-bis-tetrasulfides (CBT) which are formed through intermediates (ClSS—R—S—SCl), straight chain polymerization compounds are also obtained. As a matter of fact and as has been stated hereinabove, after separation of the crystalline cyclic compounds, an orange colored oil is obtained. This oil is a polysulfur linear polymer represented by the Formula V, wherein n=2 or 4 and Z is para-substituted alkoxybenzene:

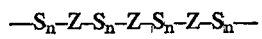

Therefore polymers of type V are formed, but their degradation would also yield the compounds of groups A, B and C.

It has thus been found that the oily linear polymer products designated by V are also reduced to the same aromatic dithiols as their corresponding cyclic crystalline products (CBT). The reaction products obtained in the preparation of CBT may thus be subjected directly to reduction without further separation of the crystalline products and the orange colored oil.

A few examples are here given of the feasibility of this reaction in obtaining a series of aromatic dithiols. The nature of R has previously been defined as a branched or unbranched aliphatic chain of carbon atoms, preferably C₁–C₅, and X may be an alkoxy (—OR') and alkylthio (S—SR') where R' may be similar to R; X may also be a halogen. The group A compounds may be further reacted to prepare a variety of bis-sulfides, disulfides, and polysulfides as shown in Table III.

Reactions of compounds of group A with:

(1) Aliphatic or aromatic compounds containing a reactive halogen will yield bis-monosulfides.

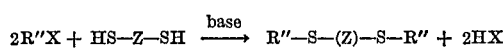

where Z is the p-substituted alkoxybenzene, X a halogen, and R'' either an aliphatic branched or unbranched hydrocarbon or substituted or unsubstituted aromatic ring. Methyl, ethyl, butyl, tert-butyl, phenyl, nitrophenyl, 2-chloro-4-nitrophenyl, polychlorophenyl compounds may thus be prepared. Table III merely lists a few possibilities in the series where x=1.

(2) With aliphatic or aromatic sulfenyl halides R''' SCl, bis-disulfides are obtained.

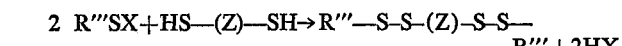

where X=a halogen, Z is the same as above and R''' is an aliphatic substituted or unsubstituted sulfenyl halide, or an aromatic substituted or unsubstituted sulfenyl halide. The ease of preparation of certain sulfenyl halides makes the synthesis of such bis-disulfides readily available. R''' may embrace groups such as the following methyl-, ethyl-, propyl-, butyl-, chloromethyl-, chloroethyl-, trichloromethyl-, chlorobutyl-, phenyl-, chlorophenyl-, polychlorophenyl-, methyphenyl-, trimethylphenyl, methyl-chlorophenyl-, nitrophenyl-, chloro-nitrophenyl-, dinitro-phenyl-, methyl-nitrophenyl-, naphthyl-, substituted naphthyl-, anthraquinoyl- and derivatives and combinations of any substituents for which the corresponding sulfenyl halide may readily be available. Table III lists a few examples where x=2.

TABLE III

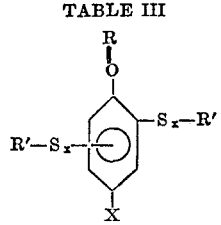

| X | R | R' | x | M.P. | Position | General formula | Calculated C | H | S | Cl | N | Analyzed C | H | S | Cl | N |
|---|---|---|---|---|---|---|---|---|---|---|---|---|---|---|---|---|
| Ethoxy | Ethyl | Methyl | 1 | 109–11 | 2:5- | $C_{12}H_{18}O_2S_2$ | 55.78 | 7.03 | 24.79 | | | 55.89 | 6.92 | 25.00 | | |
| Do | do | Ethyl | 1 | 78–78.5 | 2:5- | $C_{14}H_{22}O_2S_2$ | 58.69 | 7.74 | 22.38 | | | 58.33 | 7.84 | 22.59 | | |
| Do | do | n-Propyl | 1 | 78–78.5 | 2:5- | $C_{16}H_{26}O_2S_2$ | 61.11 | 8.33 | 20.38 | | | 61.05 | 8.60 | 20.79 | | |
| Do | do | iso-Propyl | 1 | 71–72 | 2:5- | $C_{16}H_{26}O_2S_2$ | 61.11 | 8.33 | 20.38 | | | 61.04 | 8.33 | 19.44 | | |
| Do | do | n-Butyl | 1 | 78–79 | 2:5- | $C_{18}H_{30}O_2S_2$ | 63.20 | 8.84 | 18.72 | | | 62.90 | 9.04 | 18.90 | | |
| Do | do | sec-Butyl | 1 | 17–18 | 2:5- | $C_{18}H_{30}O_2S_2$ | 63.20 | 8.84 | 18.72 | | | 63.30 | 8.56 | 18.90 | | |
| Do | do | n-Amyl | 1 | 56–57 | 2:5- | $C_{20}H_{34}O_2S_2$ | 65.01 | 9.25 | 17.30 | | | 65.01 | 9.62 | 17.50 | | |
| Do | do | n-Hexyl | 1 | 37–39 | 2:5- | $C_{22}H_{38}O_2S_2$ | 66.28 | 9.55 | 16.08 | | | 65.76 | 9.31 | 16.00 | | |
| Do | do | Cyclohexyl | 1 | 78–79 | 2:5- | $C_{22}H_{34}O_2S_2$ | 66.61 | 8.63 | 16.17 | | | 66.42 | 8.86 | 16.02 | | |
| Do | do | p-Nitrophenyl | 1 | 205–6 | 2:5- | $C_{22}H_{20}O_6S_2N_2$ | | | 13.57 | | 5.93 | | | 13.37 | | 5.60 |
| Do | do | Trichloromethyl | 2 | 119–20 | 2:5- | $C_{12}H_{12}O_2S_4Cl_6$ | | | 24.18 | 40.11 | | | | 24.00 | 40.00 | |
| Do | do | Benzoyl | 1 | 180–1 | 2:5- | $C_{24}H_{22}O_4S_2$ | 65.72 | 5.06 | 14.62 | | | 66.27 | 4.94 | 14.92 | | |
| Do | do | o-Nitrophenyl | 2 | 165 | 2:5- | $C_{22}H_{20}O_6S_4N_2$ | 49.22 | 3.76 | 23.90 | | 5.22 | 50.03 | 4.03 | 24.04 | | 5.15 |
| Do | do | Pentachlorophenyl | 2 | 205 | 2:5- | $C_{22}H_{12}O_2S_4Cl_{10}$ | 33.39 | 1.82 | 16.21 | 44.81 | | 33.24 | 1.81 | 16.26 | 44.53 | |
| Do | do | 2:4-dinitrophenyl | 2 | 198–9 | 2:5- | $C_{22}H_{18}O_{10}S_4N_4$ | | | 20.46 | | 9.62 | | | 20.76 | | 8.94 |
| Do | do | 2-nitro-4-chlorophenyl | 2 | 207–8 | 2:5- | $C_{22}H_{16}O_6S_4Cl_2N_2$ | | | 21.25 | 11.75 | 4.64 | | | 20.50 | 11.43 | 5.11 |
| Do | do | 9-anthryl | 3 | 165–6 | 2:5- | $C_{38}H_{28}O_2S_6$ | 64.46 | 3.99 | 27.17 | | | 63.78 | 4.42 | 28.65 | | |

TABLE IV

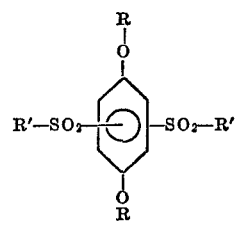

| R | R' | M.P. | General formula | Calculated C | H | S | Cl | N | Analyzed C | H | S | Cl | N |
|---|---|---|---|---|---|---|---|---|---|---|---|---|---|
| Methyl | Chlorine | 214–15 | $C_8H_8O_6S_2Cl_2$ | 28.67 | 2.41 | 19.13 | 21.15 | | 28.70 | 2.47 | 19.40 | 21.09 | |
| Ethyl | do | 190–1 | $C_{10}H_{12}O_6S_2Cl_2$ | 32.99 | 3.32 | 17.62 | 19.48 | | 33.40 | 3.27 | 18.48 | 19.50 | |
| Methyl | Amino | >300 | $C_8H_{12}O_6S_2N_2$ | | | 21.64 | | 9.46 | | | 20.18 | | 8.88 |
| Ethyl | n-Butylamino | 167–8 | $C_{18}H_{32}O_6S_2N_2$ | | | 14.69 | | 6.42 | | | 14.77 | | 6.64 |
| Do | Cyclohexylamino | 255–256 | $C_{22}H_{36}O_6S_2N_2$ | | | 13.12 | | 5.74 | | | 13.69 | | 6.27 |

NOTE.—Certain bis-sulfonamides have been listed in Table IV.

(3) With chlorodithio derivatives ($R^4$—SSCl) or derivatives ($R^4S_nCl$) where $n=2$ or greater.

2 $R^4$—$S_n$Cl + HS—(Z)—SH → $R^4$—$S_n$—(Z)—$S_n$—$R^4$ $n=3$ or greater

Table III lists an example of this reaction.

The above thus relates to the compounds of Group A as

Products of type R'''—S—S—(Z)—S—S—R''' may also be obtained by the anhydrous chlorination of CBT in carbon tetrachloride or chloroform at a temperature of —5° to 0° C. yielding disulfenyl chlorides Cl—S—Z—S—Cl (B). The Group B compounds, which were not isolated, react readily with desired mercaptans or thiophenols after removal of sulphur chlorides ($S_2Cl_2$ and $SCl_2$) which are formed during the chlorination of the CBT.
R'''—SH+Cl—S—(Z)—S—Cl+HS R'''→R'''—S—S—(Z)—S—S—(Z)—S—S—R'''+2HCl These reactions are advantageously carried out in inert solvents such as carbon tetrachloride or chloroform. The chlorination of CBT products on the other hand in acetic acid and in the presence of a trace amount of water gives good yields of the corresponding bis-sulfonyl chlorides of Group C. This procedure of preparing sulfonyl chlorides is well known, however, the bis-sulfonyl chlorides thus obtained are new compositions of matter and are useful compounds in a variety of reactions particularly in the preparation of bis-sufonamides (see Table IV). It will be appreciated by those skilled in the art that a very large number of reactions can be performed with the novel sulfonyl chlorides. Briefly, such reactions could embrace hydrolysis, reactions with alcohols and phenols, with ammonia and amines, reactions with salts of organic acids and particularly the ready reactions with aromatic hydrocarbon and some of their derivatives in the presence of aluminum chloride to give sulfones.

The new compounds that may be obtained from the Group A, B and C compounds may be represented by the formula

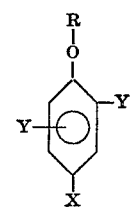

wherein

X is alkoxy or chlorine;

R is lower alkyl and

Y is SH, SCl; $SO_2Cl$; alkyl-monothio, alkyl-monothio, alkyl-dithio, trichloroalkyldithio, arylmonothio, aryldithio, aryl trithio, sulfonamido, alkyl sulfonamido, cycloalkyl-sulfonamido or aroyl-thio. Specific examples embraced by the general formula are

Aromatic dithiols

1:4-dimethoxyphenylene-2:5-dithiol
1:4-diethoxyphenylene-2:5-dithiol
1:4-dibutoxyphenylene-2:5-dithiol
4-ethoxy-1-methoxyphenylene-2:5-dithiol
4-chloro-1-methoxyphenylene-2:6-dithiol

Aromatic disulfonyl chlorides

1:4-dimethoxyphenylene-2:5-disulfonyl chloride
1:4-diethoxyphenylene-2:5-disulfonyl chloride

Derivatives of aromatic dithiols

Monothio derivatives:

1:4-diethoxyphenylene-2:5-bis-(thiomethane)
1:4-diethoxyphenylene-2:5-bis-(thioethane)
1:4-diethoxyphenylene-2:5-bis-(thio-1-propane)
1:4-diethoxyphenylene-2:5-bis-(thio-2-propane)
1:4-diethoxyphenylene-2:5-bis-(thio-1-butane)
1:4-diethoxyphenylene-2:5-bis-(thio-2-butane)
1:4-diethoxyphenylene-2:5-bis-(thio-1-pentane)
1:4-diethoxyphenylene-2:5-bis-(thio-1-hexane)
1:4-diethoxyphenylene-2:5-bis-(thiocyclohexane)
1:4-diethoxyphenylene-2:5-bis-(thiobenzoyl)
1:4-diethoxyphenylene-2:5-bis-(thio-p-nitrobenzene)

Dithio derivatives:

1:4-diethoxyphenylene-2:5-bis-(dithiochloromethane)
1:4-diethoxyphenylene-2:5-bis-(dithio-o-nitrobenzene)
1:4-diethoxyphenylene-2:5-bis-(dithio-2-nitro-4-chlorobenzene)
1:4-diethoxyphenylene-2:5-bis-(dithio-pentachlorobenzene)

Trithio derivatives:

1:4-diethoxyphenylene-2:5-bis-(trithio-9-anthracene)

Derivatives of aromatic disulfonyl chloride

1:4-dimethoxyphenylene-2:5-bis-sulfonamide
1:4-diethoxyphenylene-2:5-bis-(n-butylsulfonamide)
1:4-diethoxyphenylene-2:5-bis-(dicyclohexylsulfonamide)

The invention will now be described by several examples, it being understood, however, that these examples are given by way of illustration and not by way of limitation and that many changes may be effected without affecting in any way the scope and spirit of the invention as recited in the appended claims.

In each of Examples 1-5, the catalyst used was the Girdler Catalyst KSF/O previously referred to.

EXAMPLE 1

Preparation of cyclic bi(2,5-bis-dithio-1,4-dimethoxybenzene) $R=CH_3$, $X=\text{—}OCH_3$ in (I)

1,4-dimethoxybenzene (966 g., 7.0 moles), methylene dichloride (1500 cc.), sulfur monochloride (938 g., 7.0 moles) and catalyst (70 g.), were mixed and heated on a steam bath. A green coloration developed and HCl evolved copiously; HCl liberation gradually subsided by the end of six hours. The reaction mixture was then filtered hot through a Buchner funneel, thereby removing any unreacted starting materials which are soluble in the solvent. The orange crystalline filtrate which was contaminated with catalyst weighed 1035 g. This material is extremely insoluble and was removed from the catalyst by Soxhlet extraction with toluene to give 52.2% yield of an orange solid which melts with vitrifaction 210–212°. The material may be recrystallized from monochlorobenzene or from toluene as orange plates M.Pt. 212–214° C.

EXAMPLE 2

Preparation of cyclic bi(2,5-bis-dithio-1,4-diethoxybenzene $R=C_2H_5$, $X=OC_2H_5$, in (I)

1,4-diethoxybenzene (332 g., 2.0 moles) methylene dichloride (500 cc.), sulfur monochloride (268 g., 2.0 moles) and catalyst (20 g.), were mechanically stirred for 16 hours. Several minutes after mixing of the reactants, a slight exotherm reaction is noted, accompanied by copious evolution of hydrogen chloride gas. At the end of 16 hours the reaction mixture was warmed to 40° C. for one hour, then cooled down to room temperature. Filtration yielded 234 g. of orange crystalline solid mixed with catalyst. Extraction with chloroform yielded 144 g. of product (59.5% yield), M.Pt. 185–7° with vitrifaction after several recrystallizations from chloroform.

EXAMPLE 3

Preparation of cyclic bi(2,5-bis-dithio-4-ethoxyanisole $R=CH_3$, $X=\text{—}OC_2H_5$, in (I)

4-ethoxyanisole (76 g., 0.5 mole), chloroform (125 ml.), sulfur monochloride (67 g., 0.5 mole), and catalyst (5 g.) were mixed and mechanically stirred at room temperature for 4 hours, dduring which time hydrogen chloride evolved copiously. The mixture was then heated on a steam bath for an hour and filtered hot to remove the catalyst. The condensed and cooled filtrate was then chromatographed on an alumina column using chloroform as eluent. The bright yellow main fraction was solvent stripped. The orange plastic residue possessed a strong odor of 4-ethoxyanisole. A single wash with diethyl ether caused precipitation of fine orange crystals which melted at 158–60° C. with vitrifaction. Recrystallization from cyclohexane several times gave large orange crystals in 60% yield, M.Pt. 156–8 with vitrifaction.

EXAMPLE 4

Preparation of cyclic bi(2,6-bis-dithio-4-chloroanisole) $R=CH_3$, $X=Cl$ 4-chloroanisole (142 g., 1.0 mole), carbon tetrachloride (250 cc.), sulfur monochloride (134 g., 1.0 mole) and catalyst (15 g.), were mixed and refluxed on a steam bath until no more hydrogen chloride evolved. The reaction mixture was then filtered hot to remove the catalyst. The resulting filtrate was vacuum-stripped of solvent to leave a dark, gold-colored oil, which was chromatographed on alumina using benzene as eluent. The bright yellow main fraction was partially solvent-stripped and left to stand overnight. The yellow precipitate which formed was collected, recrystallized twice from benzene, and yielded bright yellow needles, M.Pt. 182° C.

EXAMPLE 5

Preparation of cyclic bi-(2,5-bis-dithio-1,4-dibenzyloxybenzene) $R=Ph\text{-}CH_2$, $X=O\text{-}CH_2\text{-}Ph$ in (I)

1,4-dibenzyloxybenzene (58 g., 0.2 mole), methylene dichloride (200 ml.), sulfur monochloride (27 g., 0.2 mole) and catalyst (2 g.) were mixed and refluxed for 4 hours. The reaction mixture was filtered hot to remove the catalyst. The resulting filtrate was vacuum-stripped of solvent. The yellow orange residue was twice chromatographed on alumina with chloroform as eluent in the first instance and benzene as eluent on the second column. The yellow residue was recrystallized several times from benzene to yield 3 g. (4% yield) of tiny yellow crystals M.Pt. 172–5° C., with vitrifaction.

EXPERIMENTAL SECTION IN RESPECT TO DEGRADATION OF CBT

Tables II, III and IV list the new compositions of matter which have been prepared from CBT. The new compounds have been fully characterized analytically. Below are listed some general and specific examples.

GENERAL REACTIONS

Reduction of CBT to aromatic dithiols of Group A

Examples are listed below of some reduction runs of some CBT compounds using benzene as the solvent medium (Table II).

| In I | | Time (hrs.) | Temp. (° C.) | P.s.i.g. |
|---|---|---|---|---|
| R | X | | | |
| $CH_3$ | $OCH_3$ | 4.5 | 200 | 900–1,200 |
| $CH_3$ | $OCH_3$ | 5.0 | 200 | 900–1,200 |
| $CH_3$ | $OCH_3$ | 4.6 | 200 | 900–1,200 |
| $C_2H_5$ | $OC_2H_5$ | 3.75 | 200 | 1,025–1,100 |
| $C_2H_5$ | $OC_2H_5$ | 2.0 | 200 | 1,000–1,240 |
| $C_2H_5$ | $OC_2H_5$ | 3.0 | 200 | 800–1,200 |
| $C_2H_5$ | $OC_2H_5$ | 3.75 | 200 | 800–1,200 |
| $C_2H_5$ | $OCH_3$ | 4.5 | 200 | 1,100–1,320 |
| Cl | $OCH_3$ | 3.0 | 200 | 800–1,200 |
| Cl | $OCH_3$ | 2.75 | 175 | 700–975 |
| $C_4H_9$ | $OC_4H_9$ | 5.0 | 200 | 775–1,200 |

Chlorination of CBT in anhydrous media to disulfenyl chlorides of Group B

CBT (10 g.) in chloroform (50 cc.) was cooled to −5°–0° C. in an ice/water bath. Chlorine was bubbled until the orange solution assumed a rubyred coloration. This procedure lasted about 30 minutes. The solvent and sulfur chlorides $S_2Cl_2$ and $SCl_2$ which were formed were removed under vacuum distillation at around 30° C. when a red oil was obtained. This was the disulfenyl chloride of Group B. These products could be used without further purification as intermediates in preparing bis-sulfides R'''—S—S—Z—S—S—R''' by reacting the disulfenyl chlorides with appropriate mercaptan or thiophenols in either chloroform or carbon tetrachloride. Table III lists such possible products where $x=2$.

Chlorination of CBT in acetic acid with a trace of water present to yield disulfonyl chlorides of Group C Through CBT (10 g.) in glacial acetic acid (250 cc.) and water (20 cc.), chlorine gas was bubbled at a slow rate without allowing the temperature to rise above 45° C. Chlorination was carried out for about 90 minutes. The orange crystalline CBT gradually disappeared and a pale yellow white disulfenyl chloride appeared instead. The product was filtered and may readily be used as an intermediate in a variety of possible reactions as discussed herein. Table IV lists some of the derivatives prepared and analytically characterized.

EXAMPLE 6

Method of preparing bis-alkylthio derivatives

Dialkyl sulfate (1 mole) or alkyl halide (2 moles) is added to the aromatic dithiol (1 mole) in 20% sodium hydroxide solution (0.4 kg. solution per mole). The reaction mixture was refluxed for one hour. The mixture was then cooled in an ice bath. Crude alkyl sulfide was then collected by filtration and recrystallized from ethanol R—S—Z—S—R where Z is a disubstituted phenylene radical such as 1:4 diethoxyphenylene-radical and R is lower alkyl, straight chain, branched chain or cyclic structure comprising from 1–6 carbon atoms.

SPECIFIC REACTIONS

Analytical data for all the compounds are listed in Tables II, III and IV.

EXAMPLE 7

Preparation of 1:4-diethoxyphenylene-2:5-bis-(thiomethane)

Dimethyl sulfate (12.6 g., 0.1 mole) was added to 1:4 diethoxyphenylene 2:5-dithiol (11.5 g., 0.05 mole) in 20 g. sodium hydroxide solution (4 g. NaOH, 0.1 mole) and the mixture was refluxed one hour. After cooling in an ice bath for one-half hour, the crude solids were filtered and washed several times with water. Recrystallization from ethanol gave 9 g. (70% yield) of yellow crystals, M.Pt. 109–111° C.

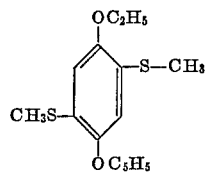

EXAMPLE 8

Preparation of 1:4-diethoxyphenylene 2:5-bis-(thiobenzoyl)

1:4-diethoxyphenylene 2:5-dithiol (5 g.) were dissolved in 20 cc. of sodium hydroxide solution (25%), to which benzoyl chloride (25 cc.) were added. The mixture was shaken vigorously under evolution of heat. The oil which is formed soon crystallizes to a white solid. This solid was then filtered and washed several times with hot water and recrystallized from benzene/cyclohexane until a constant melting point was obtained. M.Pt. 180–181° C.

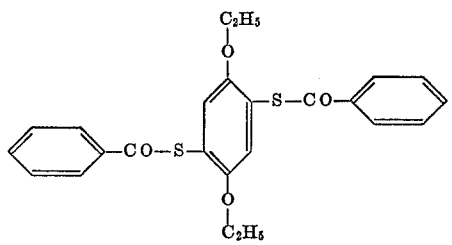

EXAMPLE 9

Preparation of 1:4-diethoxyphenylene-2:5-bis-(thio-p-nitrobenzene)

1:4-diethoxyphenylene 2:5-dithiol (2.3 g.) in ethanol (100 cc.) were added to 3.2 g. of p-chloronitrobenzene in ethanol (50 cc.) and water (20 cc.). The mixture was heated until all solids dissolved. 10 cc. of 6 N solution of sodium hydroxide was then added. The resulting deep red solution was refluxed. Precipitation appeared after about 10 minutes but the mixture was refluxed for about a half hour. The reaction mixture was then allowed to cool and the yellow bis-monosulfide was filtered. Crude M.Pt. 199–200. Recrystallization from benzene and cyclohexane gave yellow needles, M.Pt. 205–206.

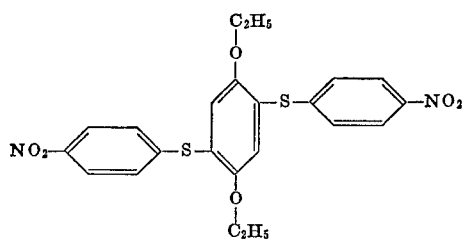

EXAMPLE 10

Preparation of 1:4-diethoxyphenylene 2:5-bis-(dithio-trichloromethane)

1:4 - diethoxyphenylene-2:5-dithiol (7.2 g.) in glacial acetic acid (50 cc.) was added to 14.4 g. of trichloromethanesulfenyl chloride in acetic acid (50 cc.). The mixture was refluxed, copious fumes of HCl evolved, and the solution turned orange. The refluxing was continued until no more hydrogen chloride evolved. The solution was cooled on ice and a yellow precipitate appeared. This crude product (5 g., M.Pt. 110–111) was washed with ethyl alcohol and finally recrystallized from ethanol, M.Pt. 118–120.

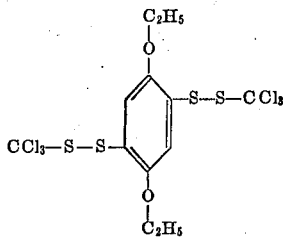

EXAMPLE 11

Preparation of 1:4-diethoxyphenylene 2:5-bis-(dithiopentachlorobenzene)

To 1:4-diethoxyphenylene 2:5-dithiol (5.6 g.) in carbon tetrachloride (50 cc.) was added slowly with stirring pentachlorobenzenesulfenyl chloride (12.8 g.) in carbon tetrachloride (150 cc.). Hydrogen chloride began evolving and the mixture was refluxed until no more hydrogen chloride gas evolved. On evaporating the solvent, substantially quantitative yield of the product is obtained. Crude M.Pt. 201–4. Recrystallization from carbon tetrachloride and petroleum ether gave M.Pt. 205.

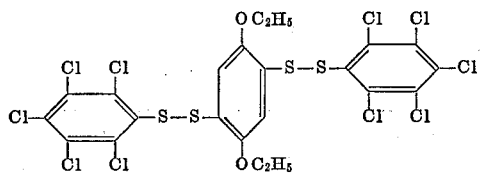

EXAMPLE 12

Preparation of 1:4-diethoxyphenylene-2:5-bis-(trithio-anthracene)

To a solution of 1:4-diethoxyphenylene 2:5-dithiol (6.9 g.) in chloroform (100 cc.) were added 9-chlorodithio anthracene (R—S—S—Cl; R=9 anthryl) (16.6 g.) in chloroform (100 cc.) and the mixture was refluxed for 30 minutes. Hydrogen chloride gas evolved and refluxing was maintained until termination of gas evolvement. The chloroform was evaporated and the orange product chromatographed on alumina using benzene as eluent. The product on recrystallization from cyclohexane/benzene has a M.Pt. of 165–166.

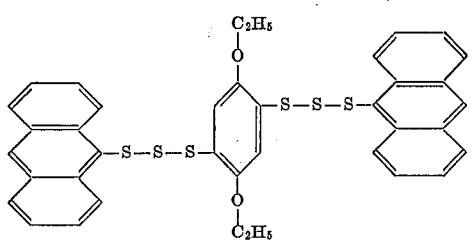

EXAMPLE 13

Preparation of 1:4-diethoxyphenylene-2:5-disulfonyl chloride Group C, R=$C_2H_5$, =$OC_2H_5$ CBT was supplied in the form of bis-(p-diethoxyphenylene tetrasulfide) (4 g.) in acetic acid (100 cc.) 10 cc. of water were added and chlorine gas was bubbled through the mixture. The temperature was not allowed to rise above 45° C. Chlorination was continued for 75 minutes when straw colored crystals appeared. Crude yield was 3.5 g. of disulfonyl chloride, M.Pt. 189–190. Recrystallization from cyclohexane gave pale yellow crystals, M.Pt. 190–191.

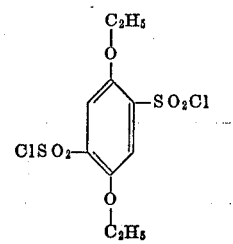

EXAMPLE 14

Preparation of 1:4-diethoxyphenylene bis-(2:5-di-cyclohexylsulfonamide)

1:4 diethoxyphenylene-2:5-disulfonychloride (3.6 g, 0.01 mole) in benzene (100 cc.) was gradually added to cyclohexylamine (3.6 g, 0.04 mole) with shaking at room temperature. The reaction was slightly exothermic. The reaction product was then refluxed for 30 minutes and left overnight. The product was then well washed with water, separated, and the benzene removed. The white bis-sulfonamide obtained was crystalline and has a crude M.Pt. of 255, yield 4 g. It may be recrystallized from dioxane to a constant M.Pt. 255–256.

EXAMPLE 15

Preparation of the bis-sulfenyl chloride by chlorination of the CBT product or the diothol The example discussed hereinabove refers to the chlorination of the dithiol. The use of the dithiol avoids any by-products such as sulfur chlorides being formed. Thus HS—R—SH+2$Cl_2$→Cl—S—R—S—Cl+2HCl 1:4-diethovyphenylene-2:5-diothiol (4.6 g.) in carbon tetrachloride (25 cc.) was cooled in ice to 0°. To this solution was added an ice cold solution of chlorine (2.8 g.) in carbon tetrachloride (100 cc.), gradually with constant shaking. Hydrogen chloride gas evolved and the solution assumed a red color. The solvent was then removed under vacuum on a steam bath and a red fuming oil was obtained which is the disulfenyl chloride. This may be used as an intermediate by reacting it with two moles of a mercaptan or thiol in an inert solvent. Thus adding pentachlorothiophenol in methylene dichloride with stirring to the above prepared disulfenyl chloride followed by gentle warming and subsequently refluxing until all evolution of hydrogen chloride gas ceased, resulted in the preparation of 1:4-diethoxyphenylene-2:5-bis - (dithiopentachlorobenzene); M.Pt. 204. This product was identical to that obtained from the reaction of 1:4-diethoxyphenylene-2:5-dithiol and pentachlorobenzenesulfenyl chloride. See Example 11.

EXAMPLE 16

Herbicidal activity

Weeds reduce crop yields and interfere with harvesting a quality crop. Herbicides have been shown to be useful tools to control undesirable foliage on agricultural land. The Group A and B compounds of the present invention may be successfully used as herbicides to control young weed seedlings. The chemicals are specifically useful in controlling undesirable foliage. The following methods were employed to test the herbicidal activity.

A spray solution containing 2000 parts per million of chemical to water was made by first dissolving two tenths of a gram of chemical in 5 milliliters of acetone and 30 milligrams of isooctyl phenyl polyethoxy ethanol. This preparation was then dispersed in 85 ml. of water making an aqueous spray solution. A potted mixture of four pregrown seedling dicotyledon weeds (broad leaf) and three seedling monocotyledon weeds (grass) were sprayed with the prepared solution to the point of run-off. The plants were held in the greenhouse for one week. Percent weed control ratings were taken on the basis of the untreated plants. The following Table V illustrates the result:

TABLE V

| Dithiols | Application rate (p.p.m.) | Percent weed control | |
|---|---|---|---|
| | | Broad leaf | Grass |
| No. 1 | 2,000 | 90 | 80 |
| No. 2 | 2,000 | 97 | 50 |
| No. 3 | 2,000 | 100 | 75 |

Compound No. 1 had the following composition:

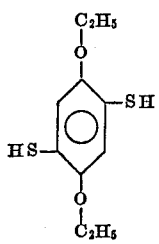

Compound No. 2 had the following composition:

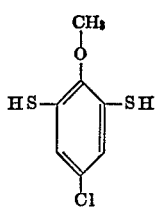

Compound No. 3 had the following composition:

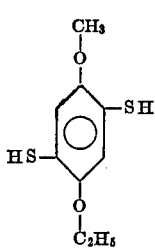

EXAMPLE 17

Fungicidal activity

The control of foliage diseases on plants is essential in order to prevent crop failure from epidemic diseases, and to maintain good yield and quality of agricultural produce so that requirements for marketing and consumption can be met.

Group C compounds were evaluated as foliage fungicides by their ability to protect plants from subsequent infection by fungus diseases.

One gram of the chemical to be tested was ground with three ml. of acetone and 50 mg. of a non-ionic surface-active agent (a Triton X–100 condensation product of an alkyl phenol and ethylene oxide). The acetone and surface-active agent are known to be inactive in the biological tests run. The mixture was diluted with water, giving suspensions containing 500 and 2000 p.p.m. of the chemical. These suspensions were sprayed on duplicate six inch tomato plants (variety Clark's Early Special) using a gun-type sprayer which delivered 2.5 ml. per second. The plants were then placed in the greenhouse, together with untreated check plants. Twenty-four hours later the treated and untreated check plants were inoculated with a suspension of *Alternaria solani* spores by means of a 20 second spray from an atomizer sprayer (delivery rate one ml. per second). The plants were then kept overnight in a controlled chamber at a temperature of 75° F. and 100% relative humidity. In the morning the plants were transferred to the greenhouse. Three days later the disease was scored by comparing the number of disease lesions of the treated plants with the untreated check.

The formula to determine percent control is:

$$100\left(\frac{\text{Avg. no. lesions on treated plant}}{\text{Avg. no. lesions on untreated plant}} \times 100\right)$$
= percent control The results are listed in the following Table VI.

TABLE VI

| Chemical | P.p.m. dosage | Percent control |
|---|---|---|
| 1,4-dimethoxy phenylene-2,5-disulfonyl chloride | 2,000 | 63 |
| | 500 | 48 |
| 1,4-diethoxy phenylene-bis-2,5-(n-butyl sulfonamide) | 2,000 | 84 |
| | 500 | 53 |
| 1,4-diethoxy phenylene-bis-2,5-dicyclohexyl sulfonamide | 2,000 | 76 |
| | 500 | 50 |
| 1,4-diethoxy phenylene-bis-2,5-(methyl sulfide) | 2,000 | 74 |
| | 500 | 65 |
| 1,4-diethoxy phenylene-bis-2,5-(n-pentyl sulfide) | 2,000 | 96 |
| | 500 | 77 |
| 1,4-diethoxy phenylene-bis-2,5-(dithiotrichloromethyl) | 2,000 | 85 |
| | 500 | 50 |

From the above table it may be seen that these compounds, as an example, have pronounced fungicidal activity in controlling Alternaria Early Blight disease of tomatoes by foliar application of the chemicals.

Disulfenyl chlorides of group B

The compounds of group B (disulfenyl chlorides) are normally used in situ and will yield, on reacting with thiols, compounds similar to types which also are obtained by reacting the dithiols of group A mentioned previously with sulfenyl chlorides. For example:

RSH+Cl—S—Z—S—Cl+HSR→
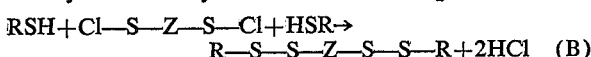  (B)

RSCl+H—S—Z—S—H+ClSR→
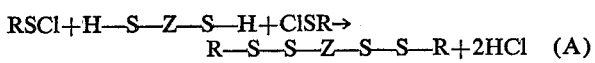  (A)

Therefore the derivatives mentioned above are applicable.

What is claimed is:
1. A compound of the formula

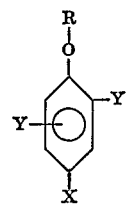

wherein X is selected from the group consisting of methoxy, ethoxy and benzyloxy;

R is lower alkyl of from 1 to 5 carbon atoms; and

Y is selected from the group consisting of sulfonamido, alkylsulfonamido of from 1 to 4 carbon atoms and cyclohexylsulfonamido.

2. A compound of claim 1 in which X is ethoxy, R is ethyl and Y is cyclohexylsulfonamido.

3. A compound of claim 1 in which X is methoxy, R is methyl and Y is sulfonamido.

4. A compound of claim 1 in which X is ethoxy, R is ethyl and Y is n-butylsulfonamido.

References Cited

UNITED STATES PATENTS

| | | | |
|---|---|---|---|
| 3,574,739 | 4/1971 | Wei et al. | 260—556 |
| 3,344,138 | 9/1967 | McManus | 260—243 |
| 3,356,692 | 12/1967 | Horstman et al. | 260—347.2 |
| 3,417,122 | 12/1968 | McManus | 260—453 |
| 2,965,655 | 12/1960 | Novello | 260—397.7 |
| 3,344,138 | 9/1967 | McManus | 260—243 |

OTHER REFERENCES

Manecke et al.: Makromol. Chem. 116, 26–35 (1968).

HENRY R. JILES, Primary Examiner

G. T. TODD, Assistant Examiner